United States Patent [19]

Michel et al.

[11] Patent Number: 4,973,483
[45] Date of Patent: Nov. 27, 1990

[54] FREEZING ADJUVANT FOR FOODSTUFFS BASED ON MINCED MEAT

[75] Inventors: Serpelloni Michel, Beuvry Les Bethune; Rossi Laurent, Lillers, both of France

[73] Assignee: Roquette Freres, Lestrem, France

[21] Appl. No.: 333,540

[22] Filed: Apr. 5, 1989

[30] Foreign Application Priority Data

Apr. 8, 1988 [FR] France ................... 88 04723

[51] Int. Cl.$^5$ .............................................. A23B 4/08
[52] U.S. Cl. ................................ 426/332; 426/643
[58] Field of Search ................................ 426/643, 332

[56] References Cited

U.S. PATENT DOCUMENTS

| | | | |
|---|---|---|---|
| 3,959,517 | 5/1976 | Niki | 426/643 |
| 4,168,323 | 9/1979 | Inamine | 426/268 |
| 4,252,794 | 2/1981 | DuRoss | 426/660 |
| 4,252,834 | 2/1981 | Inamine | 426/332 |
| 4,320,153 | 3/1982 | Ueno | 426/643 |
| 4,769,256 | 9/1988 | Malsumoto | 426/513 |
| 4,806,378 | 2/1989 | Ueno | 426/643 |

FOREIGN PATENT DOCUMENTS 62-163674 7/1987 Japan ................... 426/643
A-2015866 of 0000 United Kingdom .

OTHER PUBLICATIONS

Lee, 1984, Surimi Porcess Technology, Food Technology, Nov. 1984, pp. 69–80.
Patent Abstracts of Japan, vol. 4, No. 93 (C-17) [575], p. 122, C 17; & JP-A-55 58 058 (Nikken Kagaku K.K.) May 30, 1980.

*Primary Examiner*—Carolyn Paden
*Attorney, Agent, or Firm*—Larson and Taylor

[57] ABSTRACT

Freezing additive for foodstuffs based on minced meat, especially fish, which contains from about 50 to about 99% by weight of a cryoprotective agent which is hydrophile and soluble in water and which is constituted by a sugar and/or a sugar-alcohol, from about 0.5 to about 30% by weight of a surfactive agent and/or of an oil or a fat which are dispersed within the cryoprotective agent in a finely divided form, from 0 to about 20% of phosphates, the freezing additive being characterized by the fact that it contains at least one component adapted to improve its capability for dispersion and for dissolution, the component may consist of, on the one hand, of at least one fragilizing or brittling agent and, on the other hand, of a plurality of micro-cavities.

22 Claims, 1 Drawing Sheet

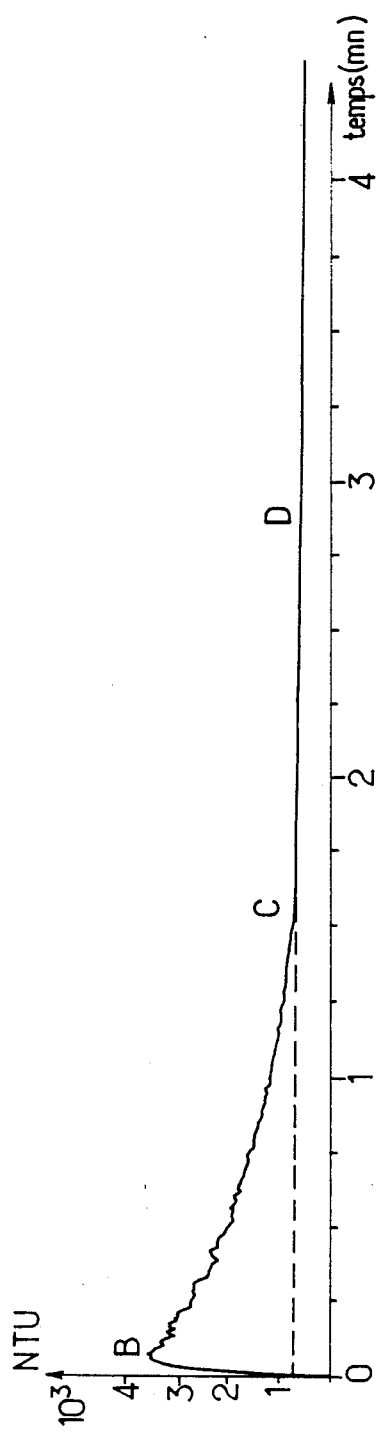

FREEZING ADJUVANT FOR FOODSTUFFS BASED ON MINCED MEAT

BACKGROUND OF THE INVENTION

The invention relates a freezing adjuvant or additive for foodstuffs based on minced meat.

It is also directed at a process for the preparation of this adjuvant or additive as well as the use of the latter in the preparation of the foodstuffs or food concerned.

It relates more particularly to foodstuffs which are based on marine animal meat and particularly fish; these foodstuffs are known under the collective Japanese term of "KAMABOKO" which covers a whole range of "seafood"; the essential constituent of these foodstuffs of the KAMABOKO type is a raw material denoted by the term, also Japanese, of "SURIMI". This is fish meat from which has been removed the skin, the bones and the guts and which is minced after prolonged washing with water.

The remoteness of fishing grounds and the fact that the production of SURIMI of satisfactory quality requires the use of extremely fresh fish flesh results in this product being manufactured more and more frequently directly on board of factory ships where it is frozen to be preservable until the time of its use for the manufacture, for example, of KAMABOKO.

Now, freezing causes the loss irreversibly of the functional properties of SURIMI and consequently of the final foodstuff of which it is an important constituent. These functional properties comprise the elasticity of the gel formed after cooking of the SURIMI and the degree of whiteness of this SURIMI.

It has been proposed, particularly by French patent Nos. 77 16687 and 79 05977, to combat the drawbacks consequent upon freezing, by incorporating with the SURIMI before freezing, and in practice at the level of chopping the fish flesh, an adjuvant which is in the form of particles constituted by:

a surface-active agent and/or an oil or fat,
a sugar or a sugar-alcohol, the surface-active agent, the oil or the fat being dispersed in the sugar or sugar-alcohol in the colloidal state, the particles concerned being of a particle size less than 0.85 mm when they contain a surface-active agent and possibly an oil or grease, and of a particle size less than 1 mm when they do not contain surface-active agents.

The particles of this known adjuvant may also contain polyphosphates.

The adjuvant concerned is only effective to the extent that it is dispersed homogeneously within the products, particularly minced fish meat, of which the functional properties are to be preserved despite the freeze processing.

And the dispersion of the adjuvant within the mass of minced meat with which it is incorporated at the time of mincing—which takes place at a temperature below 10° C., unpropitious for this dispersion but necessary to avoid any denaturation of the proteins of the fish meat—, must be rapid since the mincing step must be brief both for the reasons which have just been explained with regard to the temperature and for reasons of productivity.

According to the two French patents mentioned above, this object would be achieved by means of the low granulometry of the adjuvants described, said French patents specifying that any adjuvant of particle size greater than the above-indicated limits is to be avoided consequent upon an insufficient aptitude for dispersion and for dissolution.

However, even at the granulometries recommended by the two French patents, not only is this aptitude in no way optimal but, in addition, the particle size concerned result in the adjuvant according to said French patents having a tendency to clumping such that its storage poses very serious problems to the manufacturers, said clumping being manifested by the formation of coarse hard lumps which rapidly become impossible to employ.

SUMMARY OF THE INVENTION

Now Applicants have had the merit of finding that it was possible to overcome these drawbacks by incorporating into the constituent particles of the freezing additive concerned at least one means adapted to improve the capability of the said particles for dispersion and for dissolution, the said at least one means being selected from the group consisting, on the one hand, of at least one fragilizing or brittling agent and, on the other hand, of a plurality of microcavities.

It follows that the freezing adjuvant according to the invention which comprises:

from about 50 to about 99% by weight of a hydrophilic water-soluble cryoprotective agent constituted by a sugar and/or a sugar-alcohol, from about 0.5 to about 30% by weight of a surface-active agent and/or an oil or fat dispersed in the cryo-protective agent in a finely divided form which will be qualified below as colloidal, from about 0 to about 20% of phosphates, is characterized by the fact that it comprises at least one means adapted to improve its capability for dispersion and for dissolution, the said means being selected from the group consisting, on the one hand, of at least one fragilizing or brittling agent and, on the other hand, of a plurality of microcavities.

The freezing additive according to the invention is preferably characterized by the following features taken individually or in combination with one another:

the proportion of fragilizing or brittling agent is from about 0.5 to about 10% by weight, the fragilizing agent is selected from the group comprising native or modified starches, potato starches or celluloses, as well as microcrystalline cellulose, the plurality of microcavities has a total volume which is such that the apparent density of the constituent particles of the said additive is at the most equal to 95% of the density of the same particles, without microcavities and higher than 50%, preferably higher than 80% of their density, any narrow particle size fraction of the said additive has a density lower than 0.56, preferably lower than 0.46 and still more preferably lower than 0.42.

In the event the said additive comprises a plurality of microcavities, it is furthermore characterized by the fact that the particle size fraction comprised between 500 and 630 microns has a time of total and complete dispersion of the particles lower than 72 seconds, preferably lower than 65 seconds and still more preferably lower than 62 seconds, the particle size fraction comprised between 850 and 1000 microns has a time of total and complete dispersion of the particles lower than 108 seconds, preferably lower than 98 seconds and still more preferably lower than 92 seconds, the particle size fraction comprised between 1000 and 1500 microns has a time of total and complete dispersion of the particles lower than 150 seconds, preferably lower than 131 seconds and still more preferably lower than 120 seconds.

Due to the improvement of the aptitude for dispersion and for dissolution of the adjuvant according to the invention with respect to the adjuvants of the prior art, it even becomes possible to allow for its constituent particles a particle size higher than 1 mm inconceivable in the case of the adjuvants according to the prior art, the invention permitting consequently and unexpectedly, the overcoming of the inherent drawback to the tendency to clumping of the adjuvant according to the prior art considering that, for particles corresponding to a particle size higher than 1 mm, said tendency becomes much reduced.

Advantageously, the freezing adjuvant according to the invention has consequently a particle size centered on an average value higher than 0.50 mm and, preferably, higher than 1 mm.

The invention is directed also at a process for the preparation of the adjuvant.

According to this process, recourse is had to extrusion of a mixture comprising the melted, and/or crystallized and dehydrated sugar or sugar-alcohol, the surface-active agents and/or fats, the phosphates if it must contain them and the fragilizing agents of the above-indicated group, said extrusion being performed under conditions which permit the crystallization of the melted dehydrated sugar or sugar-alcohol.

Again according to this process when the adjuvant does not include fragilizing agents, the above-said microcavities can be included with the adjuvant particles
either by atomizing a dispersion or a solution containing the sugar and/or the sugar-alcohol, the emulsifiers and/or fats and possibly the phosphates,
or by forming a wet granulation of the constituents of the adjuvant employed in the powdered state, this wet granulation being followed by drying,
or by performing a direct extrusion in the presence of a compressed gas.

The freezing adjuvant according to the invention must be present in the product which it is intended to protect against the effects of freezing, that is to say the SURIMI when a foodstuff based on fish meat is concerned, at a concentration of 1 to 12% by weight with respect to the weight of meat.

The invention also concerns, as novel industrial products, foodstuffs, particularly those of the SURIMI type, containing from 1 to 12% by weight of the freezing adjuvant according to the invention as well as the various "seafoods" prepared from this SURIMI.

The invention is directed also at the process of preparing foodstuffs comprising the freezing adjuvant according to the invention.

This process is characterized by the fact that before freezing, an effective proportion of the adjuvant according to the invention is incorporated into said foodstuffs, this proportion being from 1 to 12% with respect to the weight of the meat when the foodstuff is constituted by SURIMI, said adjuvant being incorporated in that case into the washed fish meat in such a way that the distribution of the adjuvant within the SURIMI is as homogeneous as possible, which is achieved by performing the incorporation at the level of the mincing device.

DESCRIPTION OF THE PREFERRED EMBODIMENTS

The invention will, in any case, be well understood by means of the additional description which follows and of the examples which are not limiting but illustrate advantageous embodiments.

Proposing, consequently, to constitute a freezing adjuvant according to the invention, procedure is as follows or in equivalent manner.

The said adjuvant is made to comprise:
from about 50 to about 99% by weight of a hydrophilic water-soluble cryoprotective agent constituted by a sugar and/or a sugar-alcohol, from about 0.5 to about 30% by weight of a surface-active agent and/or an oil or fat dispersed in the cryoprotective agent in a finely divided or colloidal form, from about 0 to about 20% of phosphates and at least one of the means selected from the group consisting,
on the one hand, of a proportion from about 0.5 to about 10% by weight of at least one of the fragilizing agents of the group comprising native or modified starches, potato starches or celluloses, as well as microcrystalline cellulose,
on the other hand, of a plurality of microcavities whose total volume is such that the apparent density of the constituent particles of the adjuvant is at the most equal to 95% of the density of the same particles without microcavities and higher than 50%, preferably higher than 80% of their density.

The water-soluble hydrophilic cryoprotective agent, constituted by a sugar and/or a sugar-alcohol is advantageously selected,
as regards the sugars, from the group comprising sucrose, maltose, glucose, fructose, polydextrose and
as regards the sugar alcohols, from the group comprising sorbitol, mannitol, maltitol, xylitol and the sugar-alcohol known under the trademark PALATINIT. Sorbitol and sucrose are particularly preferred.

The surface-active agent is advantageously selected from the group comprising lecithin and the esters of fatty acids and of polyols such as glycerol, polyglycerol, propyleneglycol, sorbitan, sucrose. The esters of sorbitan and particularly the products known under the name SPAN 60 or 80 are particularly preferred.

The oil or fat is selected preferably from the group comprising soya, cotton, colza oils, suet, lard and fish fats.

The phosphates are preferably polyphosphates such as sodium pyrophosphate or sodium tripolyphosphate.

The freezing adjuvant may be of a particle size centered on an average value greater than 0.5 mm; but particle size greater than 1 mm are preferred.

It is prepared by extrusion, under conditions which permit the crystallization of the molten and/or crystallized and dehydrated sugar or sugar-alcohol, of a mixture of said sugar or sugar-alcohol, of surface-active agents and/or fats, of phosphates if it must contain them and of fragilizing agents.

When there are no fragilizing agents, the above-said microcavities are included with the adjuvant particles
either by atomizing a dispersion or solution containing the sugar and/or the sugar-alcohols, the emulsifiers and/or fats and possibly the phosphates,
or by carrying out a wet granulation of the constituents of the adjuvant employed in the powdered state, this wet granulation being followed by drying, or by performing a direct extrusion in the presence of a compressed gas.

The abovesaid extrusion can be carried out on the machines which have, for example, been described in the U.S. Pat. No. 3,618,902 to TELEDYNE INC. and whose use in the manufacture of sorbitol powder has been disclosed in U.S. Pat. No. 4,252,794 to I.C.I., or again as disclosed in French Patent No. 2,072,535 to TOWA KASEI, which patents are incorporated by reference, or again on a machine of the dual-screw type marketed by the WERNER PFLEIDERER Company.

The dispersibility of the freezing adjuvant according to the invention was determined by measuring the variations of the turbidity provoked by its dispersion in cold water.

To do this, a NOVASINA ANALITE NTM S 150 nephelometer may be used operating within the range of 0 to 20,000 NTU (turbidity units) of which the electrode is introduced into a double jacketed stainless steel beaker at a depth such that the end of the electrode is 2.5 cm from the bottom of the beaker. This beaker of internal diameter 1 cm and height 13.5 cm is filled with 600 g of water cooled to $+4°$ C. This water is kept stirred by means of a bar magnet of 1 cm diameter and 6 cm length whose rotation at 800 rpm is ensured by a magnetic stirrer placed beneath the beaker. A recorder records automatically the variations of the turbidity occasioned by the introduction of a definite amount of adjuvant into the heart of the vortex formed by the cold water. The amount of adjuvant used was selected at each experiment so that a final concentration of 30 g of sugar-alcohol dissolved in 600 g of water is obtained.

There is shown in the accompanying single drawing a curve $C_1$ showing the variations in the turbidity as a function of time, in other words as a function of the gradual dissolution of the sugar or sugar-alcohol, which dissolution tends towards an asymptotic limit corresponding to the total dissolution of the sugar or the sugar-alcohol, the residual turbidity coming from insoluble constituents of the adjuvant.

This curve comprises, from the moment 0 of the introduction:

a first segment A B, of very steep slope, corresponding to the dispersion of the grains of the adjuvant in the cold water and to the appearance of a macroscopic cloudiness, a second segment B C, of very quickly decreasing slope then tending towards 0, corresponding to the solubilisation of the glucid matrix and hence to the reduction of the cloudiness associated with the presence of macroscopic particles, a third segment C D, of slope equal to zero, of which the ordinate at the origin corresponds to the residual cloudiness associated with the presence in the cold water of microparticles constituted by insoluble components of the adjuvant.

The time corresponding to the point C of the curve $C_1$ has been taken as a reference of the total and complete dispersion of the adjuvant.

The tendency to clumping of the powders was determined in the manner described below.

Recourse was had to equipment comprising:

a stainless steel tube: height 4.5 cm, internal diameter 4 cm, a steel cylinder: diameter 3.9 cm, weight 425 g, by means of which pressure was exerted on the base of about 35 g/cm$^2$, an oven with controlled temperature and hygrometry, a PETRI dish, a paper band: length 14 cm, width 5 cm, used to facilitate the subsequent unmolding.

Successively, against the inner wall of the tube, without sticking to it, is applied the paper band, then the unit is placed on the cover of the PETRI dish, 35 g of powder are poured into the tube, for each test two tubes thus lined with powder are prepared, one tube is left as such and on the surface of the powder contained in the second tube is placed the steel cylinder. (The latter will then exert on the powder a pressure substantially equivalent to that existing at the bottom of a cylindrical package containing 50 kg of powder), the two samples are left to stand for 15 days in the oven at a relative humidity of 30% repeating temperature cycles of 20° C. during 16 hours, then 40° C. during 8 hours, at the end of 15 days, the powders are unmolded by removing first the cylinder and then by unrolling the paper strip.

The result of these experiments enables the tendency to clumping of the powder to be estimated.

A strong tendency to clumping is manifested after unmolding by complete preservation of the cylindrical shape of the mold whilst an absence of a tendency to clumping is manifested by the immediate formation of a cone of powder.

There is of course applied an intermediate qualification (average tendency, low) to the different conformations that the powder may take up during its unmolding.

Of course, in order that the results may be comparable with one another, dispersion and clumping tests were carried out on identical and narrow granulometric fractions.

As comparative example representing the prior art, the adjuvant known under the trademark PREBEST TP 433 marketed by the UENO Company (Japan), was taken. This freezing adjuvant which is intended for the preparation of SURIMI and of which the composition is as follows:

| sorbitol | 87% by weight |
|---|---|
| glycerol esters | 6.5% by weight |
| polyphosphates | 6.5% by weight | showed on granulometric analysis the following spectrum (standard AFNOR NF-X-11-504, December 1970):

| particles of size below 200 microns | 3% |
|---|---|
| particles of size below 250 microns | 5% |
| particles of size below 355 microns | 13% |
| particles of size below 500 microns | 26% |
| particles of size below 800 microns | 76% |
| particles of size below 1000 microns | 99%. |

The particle size of this product is hence centered at an average value of about 630 microns.

EXAMPLE

In a TELEDYNE READCO extrusion installation such as described in U.S. Pat. No. 4,252,794 are prepared a certain number of adjuvants by introducing a mixture composed per 100 parts by weight of sorbitol, of:

5.98 parts of SPAN 80 (monooleic ester of sorbitan)
3.00 parts of sodium tripolyphosphate,
3.00 parts of neutral sodium pyrophosphate,
a variable number of parts of crumbling or fragilizing agent (see Table I), this fragilizing agent being introduced just before extrusion, and the extrusion is conducted so that at the outlet from the extruder the temperature of the adjuvant is 90° C.; after cooling, the product obtained was ground and then sieved.

A control not including fragilizing agent was also prepared as well as an adjuvant not including fragilizing agent but a plurality of microcavities constituting a porous network within the particles.

The plurality of microcavities was obtained by wet granulation of a fine powder of the control product. More precisely, 10% of water was added slowly to a fine powder of particle size centered on an average value below 150 microns of the extruded product without fragilizing agent, this in a HOBART type mixer, then the agglomerates formed were dried in a fluidized bed dryer of the AEROMATIC type. The resulting product was sifted.

For all the products obtained, the dispersion and clumping tests and the determination of the density were carried out on narrow granulometric fractions in the manner described above. The granulometric fractions taken were, for the finest among them, from 500 to 630 microns, for the intermediate fraction, from 850 to 1000 microns and, for the coarsest, from 1000 to 1500 microns.

In the following Table I, are indicated:

the average dispersion times of a group of tests corresponding to point C of the curve $C_1$ obtained by the measurement of the nephelometry and expressed in seconds, the fragilizing agents employed and their proportion and the apparent density, measured in a test-tube, of the powders for the particle size fraction of 500 to 630 microns.

TABLE I

| Freezing Adjuvant | Fragilizing agent Nature | Fragilizing agent Proportion | Average Dispersion Times (in seconds) Granulometric Fraction 500–630 μm | 850–1000 μm | 1000–1500 μm | Density (Granulometric Fraction) 500–630 μm |
|---|---|---|---|---|---|---|
| PREBEST TP 433 before sifting | | | | 84 | | |
| PREBEST TP 433 after separation (*) | | | 75 | 108 | | 0.58 |
| Adjuvant according to the invention with microcavities (**) | | | 59 | 83 | 125 | 0.43 |
| Adjuvant according to the invention | Corn Starch | 1% | 57 | 93 | 127 | |
| | | 4% | 54 | 76 | 97 | |
| | | 8% | 48 | 69 | 94 | |
| Adjuvant according to the invention | Potato Starch | 2% | 52 | 64 | 84 | 0.42 |
| | | 4% | 53 | 71 | 94 | 0.43 |
| | | 8% | 62 | 92 | 120 | |
| Adjuvant according to the invention | Wheat Starch | 2% | 65 | 98 | 131 | 0.46 |
| | | 4% | 63 | 89 | 115 | |
| Adjuvant according to the invention | Carboxy-methylated Potato Starch | 4% | 58 | 83 | 128 | |
| | | 8% | 57 | 74 | 105 | |
| Adjuvant according to the invention | Microcrystalline Cellulose | 2% | 62 | 91 | 120 | |
| | | 4% | 67 | 103 | 136 | |
| Experimental control without fragilizing agent and without microcavities | | | 72 | 110 | 150 | 0.5 |

(*) into granulometric fractions by sifting
(**) (apparent density of 86% of the density before granulation)

Under the conditions described for the clumping tests, neither of the two products whose granulometry was greater than 850 microns (fractions of 850 to 1000 microns and from 1000 to 1500 microns) had a marked tendency to clumping whilst the product of which the particle size is less than 850 (fraction from 500 to 630 microns) showed, even without application of pressure, a certain tendency to clumping, this tendency becoming considerable upon the application of pressure.

These tests demonstrate that the creation of a porous network or the introduction into the particles of adjuvant of a fragilizing agent distinctly reduces the dispersion time in cold water of these particles; the invention therefore provides freezing adjuvants which do not clump and of which the speed of dispersion is increased with respect to the products of the prior art; in the abovesaid examples, the best results were obtained by the presence in the particles of adjuvant either of a proportion of 2% of potato starch, or of a proportion of 8% of corn starch.

I claim:

1. In a freezing particulate adjuvant composition for frozen foodstuffs based on minced meat, especially fish, said particulate adjuvant comprising particles which comprise from about 50 to about 99% by weight of a cryoprotective agent which is hydrophilic and soluble in water and which is at least one member selected from the group consisting of a sugar and a sugar-alcohol, from about 0.5 to about 30% by weight of at least one member selected from the group consisting of a surface active agent, an oil, and a fat, dispersed within the cryoprotective agent in a finely divided form, and from 0 to about 20% of phosphates, the improvement wherein said particles further comprise at least one member selected from the group consisting of at least one fragilizing or brittling agent and of a plurality of microcavities, whereby the capability of said particles for dispersion and dissolution in water is increased.

2. A particulate adjuvant composition according to claim 1, wherein the fragilizing or brittling agent is present in an amount of from about 0.5 to about 10% by weight.

3. A particulate adjuvant composition according to claim 1, wherein the fragilizing agent is selected from the group consisting of native starches, modified starches, potato starches, celluloses and microcrystalline cellulose.

4. A particulate adjuvant composition according to claim 1, wherein the plurality of microcavities has a total volume which is such that he apparent density of the constituent particles of the particulate adjuvant composition is from 50 to 95% of the density of the same particles before being provided with microcavities.

5. A particulate adjuvant composition according to claim 1, wherein the plurality of microcavities has a total volume which is such that the apparent density of the constituent particles of the particulate adjuvant composition is from 80 to 95% of the density of the same particles before being provided with microcavities.

6. A particulate adjuvant composition according to claim 1, wherein any narrow particle size fraction of the said particulate adjuvant composition has a density lower than 0.56.

7. A particulate adjuvant composition according to claim 1, wherein any narrow particle size fraction of the said particulate adjuvant composition has a density lower than 0.46.

8. A particulate adjuvant composition according to claim 1, wherein any narrow particle size fraction of the said particulate adjuvant composition has a density lower than 0.42.

9. A particulate adjuvant composition according to claim 1, wherein said particles comprise said plurality of microcavities, and wherein
the particle size fraction between 500 and 630 microns has a time of total and complete dispersion o the particles in water lower than 108 seconds,
the particle size fraction between 1000 and 1500 microns has a time of total and complete dispersion of the particles in water lower than 150 seconds.

10. A particulate adjuvant composition according to claim 1, wherein said particles comprise said plurality of microcavities, and wherein
the particle size fraction between 500 and 630 microns has a time of total and complete dispersion of the particles in water lower than 65 seconds,
the particle size fraction between 850 and 1000 microns has a time of total and complete dispersion of the particles in water lower than 98 seconds,
the particle size fraction between 1000 and 1500 microns has a time of total and complete dispersion of the particles in water lower than 131 seconds.

11. A particulate adjuvant composition according to claim 1, wherein said particles comprise said plurality of microcavities, and wherein
the particle size fraction between 500 and 630 microns has a time of total and complete dispersion of the particles in water lower than 62 seconds,
the particle size fraction between 850 and 1000 microns has a time of total and complete dispersion of the particles in water lower than 92 seconds,
the particle size fraction between 1000 and 1500 microns has a time of total and complete dispersion of the particles in water lower than 120 seconds.

12. A particulate adjuvant composition according to claim 1, having a particle size centered on an average value higher than 0.50 mm.

13. A particulate adjuvant composition according to claim 1, having a particle size centered on an average value higher than 1 mm.

14. A particulate adjuvant composition according to claim 1, wherein said cryoprotective agent comprises a sugar selected from the group consisting of sucrose, maltose, glucose, fructose and polydextrose.

15. A particulate adjuvant composition according to claim 1, wherein said cryoprotective agent comprises a sugar-alcohol selected from the group consisting of sorbitol, mannitol, maltitol and xylitol.

16. A particulate adjuvant composition according to claim 1, wherein said surface active agent is selected from the group consisting of lecithin and fatty acid esters of polyols of the group consisting of glycerol, polyglycerol, propyleneglycol, sorbitan and sucrose.

17. A particulate adjuvant composition according to claim 1, wherein said surface active agent is selected from the group consisting of an oil selected from the group consisting of the oils of soya, cotton, and colza, and a fat selected from the group consisting of tallow, lard and fats from fish.

18. A particulate adjuvant composition according to claim 1, wherein the phosphate is selected from the groups consisting of sodium pyrophosphate and sodium tripolyphosphate.

19. Process for the preparation of the particulate adjuvant composition according to claim 1, comprising forming a mixture of the constituents of the particulate adjuvant composition with said fragilizing or brittling agent, extruding said mixture, and grinding and sieving the extruded mixture.

20. Process for the preparation of the particulate adjuvant composition according to claim 1, comprising forming a mixture of the constituents of the particulate adjuvant composition except for the fragilizing or brittling agent, extruding the said mixture, grinding and sieving the extruded mixture, wetting with water the ground and sieved extruded mixture thus causing granulation, and drying the granulated mixture in a fluidized bed.

21. A SURIMI food product containing from 1 to 12% by weight of a particulate adjuvant composition according to claim 1.

22. Process for the preparation of a food product comprising minced fish meat which is intended to be frozen, comprising incorporating into minced fish meat an additive according to claim 15 in a proportion from 1 to 12% by weight with respect to the weight of minced fish meat, and subsequently freezing said food product.

* * * * *

UNITED STATES PATENT AND TRADEMARK OFFICE
CERTIFICATE OF CORRECTION

PATENT NO. : 4,973,483
DATED : November 27, 1990
INVENTOR(S) : SERPELLONI ET AL

It is certified that error appears in the above—identified patent and that said Letters Patent is hereby corrected as shown below:

Column 9, line 55: after "dispersion" delete "o" and insert --of the particles in water lower than 72 seconds,--.

Column 9, line 56: before "the particles" insert --the particle size fraction between 850 and 1000 microns has a time of total and complete dispersion of--.

Signed and Sealed this

Tenth Day of August, 1993

Attest:

MICHAEL K. KIRK

Attesting Officer

Acting Commissioner of Patents and Trademarks